F. N. McCORKLE.
COTTON HARVESTER.
APPLICATION FILED NOV. 7, 1917.

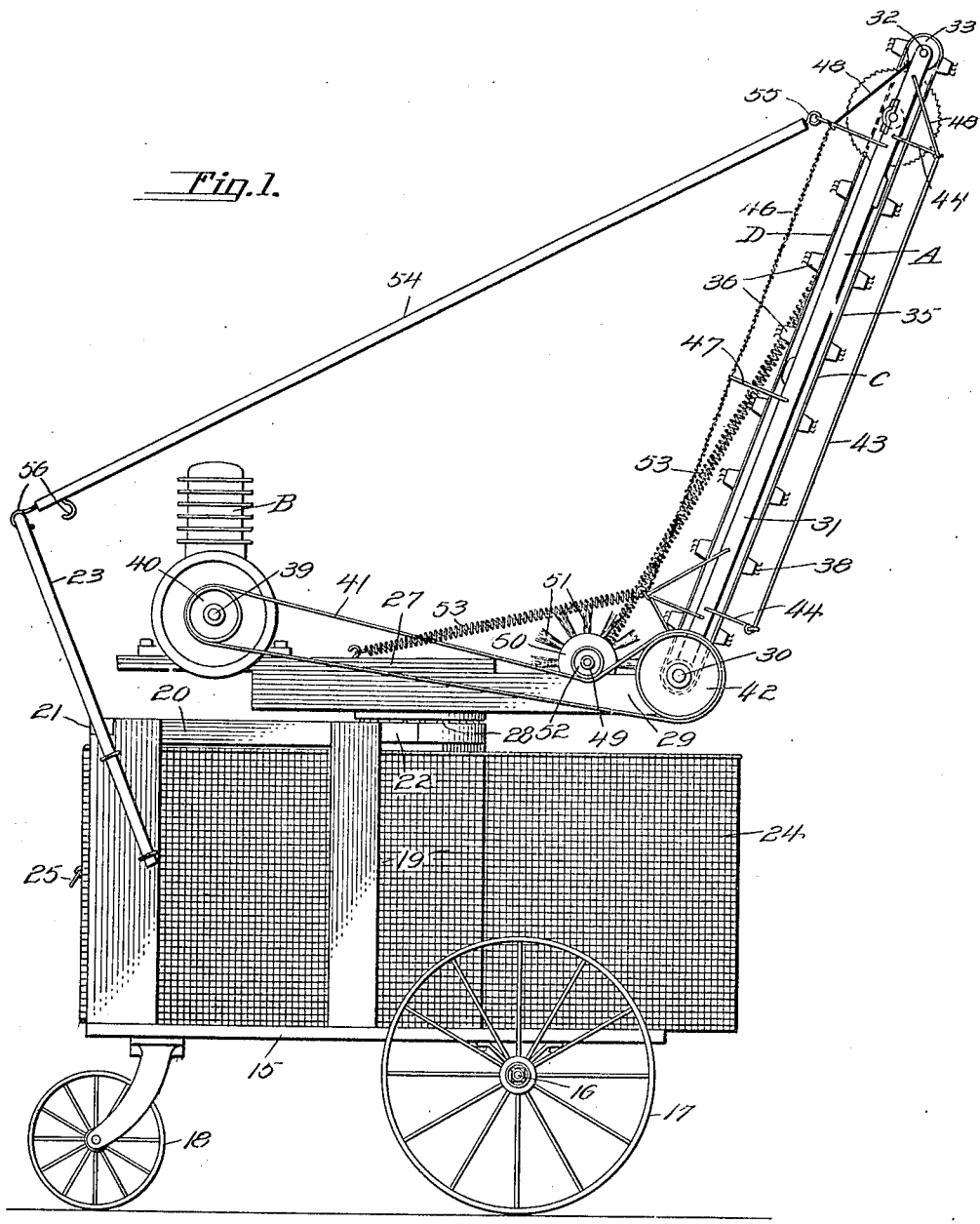

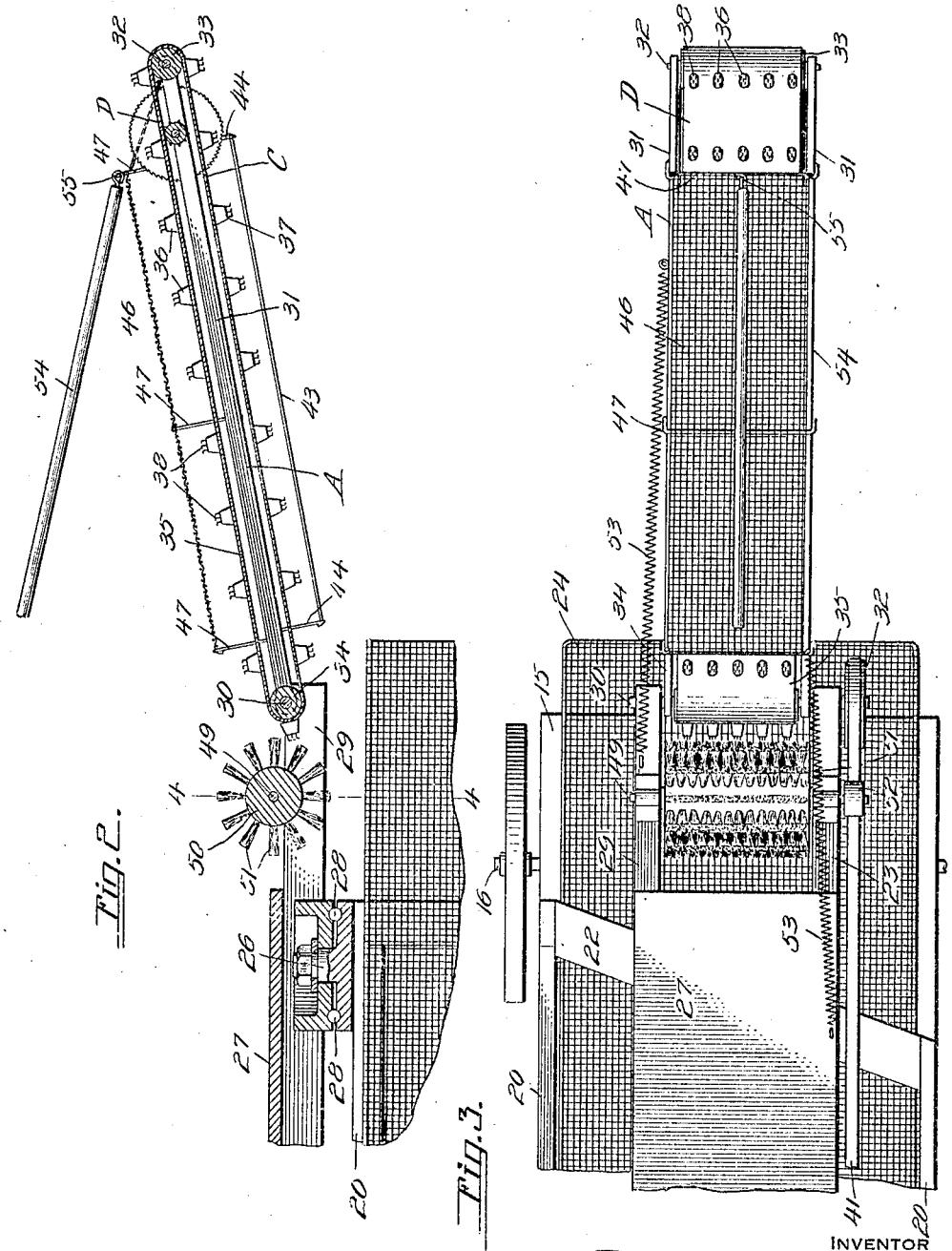

1,291,652.

Patented Jan. 14, 1919.
4 SHEETS—SHEET 3.

WITNESSES
F. C. Gibson.
E. E. Young.

INVENTOR
F. N. McCorkle.

BY Victor J. Evans
ATTORNEY

F. N. McCORKLE.
COTTON HARVESTER.
APPLICATION FILED NOV. 7, 1917.
1,291,652.
Patented Jan. 14, 1919.
4 SHEETS—SHEET 4.
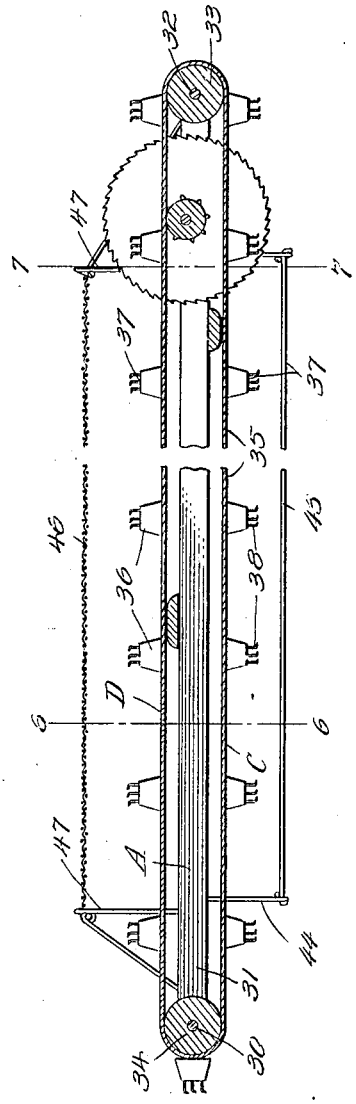
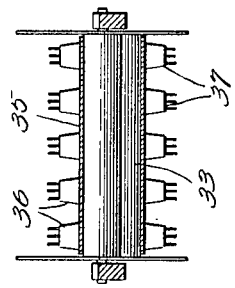
WITNESSES
F. C. Gibson.
E. E. Young
INVENTOR
F. N. McCorkle.
BY Victor J. Evans
ATTORNEY

UNITED STATES PATENT OFFICE.

FRANCIS N. McCORKLE, OF ATHENS, GEORGIA.

COTTON-HARVESTER.

1,291,652.  Specification of Letters Patent.  Patented Jan. 14, 1919.

Application filed November 7, 1917. Serial No. 200,782.

*To all whom it may concern:*

Be it known that I, FRANCIS N. MCCORKLE, a citizen of the United States, residing at Athens, in the county of Clarke and State of Georgia, have invented a new and useful Improvement in Cotton-Harvesters, of which the following is a specification.

This invention relates to cotton harvesters and it has for its object to produce a simple, improved and efficient machine which will be readily portable and by means of which the cotton locks may be easily and quickly detached from the bolls and gathered.

A further object of the invention is to produce a simple and portable machine of the character described which may be readily manipulated by a single operator, the machine being equipped with a driven endless gathering device for detaching the locks, a stripping device for stripping the locks from the gathering device, and a receptacle into which the locks will be discharged by the strip; said receptacle being so arranged that it may be conveniently handled for emptying the same when necessary.

A further object of the invention is to produce a simple and improved machine of the character described which will be mounted on a light wheeled support, capable of being pushed over the field by the operator, the machine being equipped with gathering means capable of being freely manipulated by the operator while the machine is being moved along and also while the machine is at rest; driving means for the gathering and stripping means being likewise mounted on the wheeled support.

Further objects of the invention are to simplify and improve the construction and arrangement of the detailed parts constituting the mechanism of the improved machine.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Figure 1 is a side elevation of a machine constructed in accordance with the invention.

Fig. 2 is a longitudinal vertical sectional view of the front part of the machine showing the gathering device in position for operation.

Fig. 3 is a top plan view of the parts shown in Fig. 2.

Fig. 6 is a transverse sectional view taken on the line 6—6 in Fig. 5.

Fig. 7 is a transverse sectional view taken on the line 7—7 in Fig. 5.

Corresponding parts in the several figures of the drawings are denoted by like characters of reference.

Figure 4:
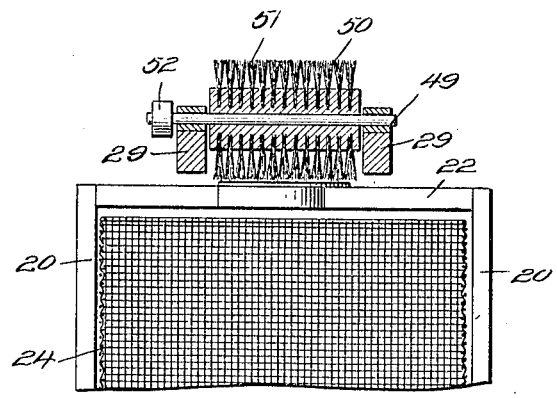
Fig. 4 is a transverse sectional view taken on the line 4—4 in Fig. 2.
Figure 5:
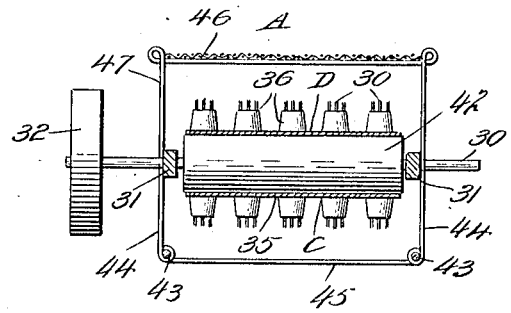
Fig. 5 is a longitudinal sectional view on an enlarged scale of the gathering device.

The improved machine includes in its construction a platform 15 supported intermediate its front and rear ends on an axle 16 having ground wheels 17. The rear end portion of the platform is supported on a caster wheel or trailer 18 which enables the machine to be conveniently steered as it is being pushed along. The platform is provided at the two sides thereof with uprights or stakes 19 which, together with side members 20 and a rear cross bar 21 constitute a frame structure. An intermediate cross bar 22 is also provided, said intermediate cross bar being strongly constructed and supported in order to afford a reliable supporting means for superposed parts of the mechanism of the improved harvester. An arched handle 23 is suitably connected with the rear portion of the frame structure to be laid hold of by the operator for the purpose of pushing or propelling the machine. Movably supported on the platform 15 between the stakes 19 and beneath the cross bars 21 and 22 is a receptacle 24, said receptacle being preferably in the form of a basket of woven wire fabric which will be light, durable, easily manipulated and of large capacity. The rear end wall of the basket 24 is provided with a handle 25 for convenience in removing, emptying and replacing the same.

The cross bar 22 is provided with an upwardly extending pivot member 26 which is substantially vertically disposed and about which turns a turn table 27, it being understood that between the turn table and the cross bar anti-friction members 28 may be interposed for convenience in rotating the turn table about its axis with little effort on the part of the operator. The turn table is of elongated shape and it is provided with forwardly extending arms or brackets 29 provided at their forward ends with bearings for a shaft 30. Supported pivotally on the shaft 30 intermediate the arms 29 is a conveyer frame A comprising side members 31 which are suitably connected together and spaced apart. Supported for rotation on the side members 31 adjacent to the free ends thereof is a shaft 32 carrying a roller 33. A similar roller 34 is securely mounted on the shaft 30 and over said rollers 33 and 34 is trained an endless belt or apron 35. Securely mounted on said belt and extending outwardly with respect to the face thereof are fingers 36, said fingers having been shown as being arranged in rows but with the understanding that they may be arranged or disposed in any convenient and suitable manner. The fingers 36 have flat faces 37, each face being provided with a plurality of outwardly extending sharp pointed hooks 38, the points of said hooks being faced in the direction of the movement of the belt. The belt 35 is driven by a motor B which may be of any desired type and construction. In practice it is intended to use a small gasolene or internal combustion engine motor having a driving shaft 39 provided with a band wheel or pulley 40 from which a belt or band 41 is trained over a pulley 42 on the shaft 30 which may thus be driven when the machine is in operation. It will be particularly noticed that the motor surface has a weight to counterbalance the gathering and stripping devices and it is intended that the said motor shall be mounted in such a position that the gathering and stripping devices will be counterbalanced as equally as possible, thereby greatly facilitating the operation of the device.

The two leads of the belt or apron 35 intermediate the pulleys 33 and 34 will be designated respectively as the front lead C and the rear lead D, the front lead being the plant engaging lead and the rear lead that which faces the operator. The front lead C is guarded by guard rails 43 that are supported by arms or brackets 44 connected with the side members 31 of the conveyer frame, said arms or brackets being also connected together by cross bars 45 extending across the conveyer frame. These guard rails and cross bars will to some extent prevent the bolls, leaves and twigs from being disengaged and carried along with the cotton locks. The rear lead of the conveyer belt or apron is protected by a shield 46 which is supported in spaced relation thereto by means of yokes or arch members 47 that are connected with the side members of the conveyer frame. This shield 46 may be constructed of any suitable material and in any convenient manner. I prefer, however, that said shield be constructed of woven wire fabric of suitable, rather large mesh as shown in the drawings, the reason for this preferred construction being that the said shield will present a rubbing surface that will be engaged by the cotton locks, etc., that are detached and carried along by the action of the hook carrying fingers of the conveyer belt, this rubbing action having a loosening effect whereby a considerable quantity of dust and rubbish will be loosened and detached. The arms 44 carrying the guard rails 43 as well as the yokes 47 carrying the shield 46 may be reinforced by suitably arranged braces 48.

Supported for rotation on the arms or brackets 29 of the turn table is a shaft 49 carrying a stripping cylinder 50, said cylinder being provided with radially extending brushes 51 of wire or like material by the action of which the cotton locks will be stripped from the hook carrying fingers of the conveyer and thrown, by the centrifugal action of the stripping cylinder, into the basket or receptacle 24. The shaft 49 carries a pulley 52 which may be driven in the proper direction by one lead of the band 41.

The conveyer frame A is connected with the body of the turn table by springs 53 which serve to assist materially in supporting the weight of the conveyer frame when the latter is moved in a plant engaging direction. This is done by means of a rod or handle 54 one end of which is connected by a hook and eye connection 55 with one of the yokes 47 at the free end of the conveyer frame. The other end of the handle, which may be grasped by the operator, is also provided with hooks 56 arranged for convenient engagement with the handle member 23 or with the rear cross bar 21 of the frame structure.

In the operation of this device the machine may be propelled between two rows of plants by the operator, the endless conveyer being driven by the motor B. The operator may stop the machine at short intervals for convenience in manipulating the gathering mechanism, but said gathering mechanism may also be manipulated while the machine is in motion. To operate the gathering mechanism, the operator lays hold of the handle 54, utilizing the same to swing the conveyer frame over the plants in such a fashion as to bring the hook carrying fingers of the conveyer belt in engagement with the plants, thereby detaching the cotton locks and causing the same to be carried to the basket or receptacle into which they will be discharged by the action of the stripping cylinder. It is obvious that the turn table will enable the gathering mechanism to be swung to either side of the machine, and that by proper manipulation of the conveyer frame the conveyer may be utilized to reach every lock that is ready for gathering. When the plants within reach have been stripped, the machine may be pushed a little farther along and the operation repeated although obviously, as hereinbefore stated, the gathering mechanism may be manipulated while the machine is being pushed slowly along. The cotton may be packed in the basket or receptacle as tightly as may be desired and the contents may be discharged in any convenient place.

Having thus described the invention, what is claimed as new is:

1. In a cotton harvester, a wheel supported frame structure having a cross bar, a turn table mounted on the bar, a gathering device carried by the turn table and including moving parts, cotton stripping means for said device, a motor supported on the turn table and counterbalancing the gathering device and said stripper means, and means for transmitting motion from said motor to the moving parts of the gathering device.

2. In a cotton harvester, a wheel supported frame structure, a turn table supported thereon, a gathering device supported at one end of the turn table and including an endless conveyer, cotton stripping means for said device, a motor supported near the other end of the turn table in counterbalancing position with respect to the gathering device and said stripping means, and means for transmitting power from the motor to the conveyer.

3. In a cotton harvester, a wheel supported frame structure, a turn table supported thereon, a gathering device mounted on the turn table and including an endless conveyer, a cotton stripping device also supported on the turn table, and a motor mounted on the turn table in counterbalancing position with respect to the gathering device and the stripping device; and means for transmitting motion from said motor to the moving parts of the gathering device and the stripping device.

4. In a cotton harvester, a wheel supported frame structure, a turn table supported thereon and having forwardly extending arms, a conveyer frame supported pivotally with respect to the arms, shafts extending through said conveyer frame, a driven conveyer trained over said shafts and having outwardly extending fingers carrying sharp pointed hooks, a cotton stripping device supported for rotation on the arms of the turn table, a motor supported on the turn table in counterbalancing position with respect to the gathering device and the stripping device, and means for transmitting power from said motor to the moving parts of the gathering device and the stripping device.

5. In a cotton harvester, a wheel supported frame structure, a receptacle mounted thereon, a turn table supported above the receptacle and having forwardly extending arms, a gathering device including a conveyer frame pivotally supported by said arms, a cotton stripping cylinder supported for rotation on said arms, a spring connecting the pivotally supported conveyer frame with the body of the turn table, a motor supported on the turn table for driving the gathering and stripping devices, and a handle connected with the free end of the conveyer frame for moving said frame in plant engaging direction against the tension of the spring.

6. In a cotton harvester, a gathering device comprising a turn table having forwardly extending arms, a shaft extending through said arms, a conveyer frame pivoted on said shaft and having another shaft extending transversely therethrough, an endless conveyer trained over said shafts, said conveyer having outwardly extending fingers provided with sharp pointed prongs, cotton stripping means for said device, and means for driving the endless conveyer.

7. In a cotton harvester, a gathering device comprising a turn table having forwardly extending arms, a shaft extending through said arms, a conveyer frame pivoted on said shaft and having another shaft extending transversely therethrough, an endless conveyer trained over said shafts, said conveyer having outwardly extending fingers provided with sharp pointed prongs, and means for driving the endless conveyer, in combination with guard rails supported adjacent to and spaced from the front lead of the endless conveyer and cotton stripping means for said device.

8. In a cotton harvester, a gathering device comprising a turn table having forwardly extending arms, a shaft extending through said arms, a conveyer frame pivoted on said shaft and having another shaft extending transversely therethrough, an endless conveyer trained over said shafts, said conveyer having outwardly extending fingers provided with sharp pointed prongs, and means for driving the endless conveyer, in combination with a foraminous shield supported adjacent to and spaced from the rearward lead of the endless conveyer and cotton stripping means for said device.

9. In a cotton harvester, a gathering device comprising a turn table having forwardly extending arms, a shaft extending through said arms, a conveyer frame pivoted on said shaft and having another shaft extending transversely therethrough, an endless conveyer trained over said shafts, said conveyer having outwardly extending fingers provided with sharp pointed prongs, and means for driving the endless conveyer, in combination with guard rails supported adjacent to and spaced from the front lead of the endless conveyer, and a foraminous shield supported adjacent to and spaced from the rearward lead of said conveyer and cotton stripping means for said device.

10. In a cotton harvester, a turn table having forwardly extending arms, a receptacle supported beneath said turn table, a gathering device including an endless conveyer and a frame for said conveyer, said frame being pivotally supported between the arms of the turn table, a cotton stripping cylinder supported for rotation on the arms of the turn table adjacent to the gathering device, said stripping cylinder being arranged to discharge into the receptacle beneath, a motor supported on the turn table in counterbalancing position with respect to the gathering and stripping devices, and means for transmitting power from the motor to said gathering and stripping devices.

In testimony whereof I affix my signature.

FRANCIS N. McCORKLE.

Copies of this patent may be obtained for five cents each, by addressing the "Commissioner of Patents, Washington, D. C."